US012613517B2

(12) United States Patent
Derhake

(10) Patent No.: US 12,613,517 B2
(45) Date of Patent: Apr. 28, 2026

(54) FAULT MONITORING SYSTEMS AND METHODS

(71) Applicant: ANALOG DEVICES, INC., Wilmington, MA (US)

(72) Inventor: Mark Patrick Derhake, Wilmington, MA (US)

(73) Assignee: Analog Devices, Inc., Wilmington, MA (US)

( * ) Notice: Subject to any disclaimer, the term of this patent is extended or adjusted under 35 U.S.C. 154(b) by 78 days.

(21) Appl. No.: 18/520,710

(22) Filed: Nov. 28, 2023

(65) Prior Publication Data

US 2024/0210931 A1 Jun. 27, 2024

Related U.S. Application Data

(60) Provisional application No. 63/435,206, filed on Dec. 23, 2022.

(51) Int. Cl.
| | |
|---|---|
| *G05B 23/02* | (2006.01) |
| *B60R 16/023* | (2006.01) |
| *H04L 41/06* | (2022.01) |

(52) U.S. Cl.
CPC ...... *G05B 23/0213* (2013.01); *B60R 16/0232* (2013.01); *H04L 41/06* (2013.01)

(58) Field of Classification Search
CPC . G05B 23/0213; B60R 16/0232; H04L 41/06; H04L 43/0817; H04L 2012/40215; H04L 1/1671; H04L 1/1829; H04L 12/40169; H04L 41/0686; G01R 31/006; G01R 31/2836; G06F 11/0739; G06F 11/0772; G06F 2213/3852; G06F 13/128;
(Continued)

(56) References Cited

U.S. PATENT DOCUMENTS

| | | | | |
|---|---|---|---|---|
| 8,549,198 | B2 * | 10/2013 | Cohen | ................. G06F 13/4004 |
| | | | | 713/168 |
| 2021/0302488 | A1 | 9/2021 | Liu et al. | |
| 2025/0078583 | A1 * | 3/2025 | Alastair-Hunter ... | G07C 5/0808 |

FOREIGN PATENT DOCUMENTS

WO 2007079085 A2 7/2007

OTHER PUBLICATIONS

Texas Instruments, "TPS929120-Q1 12-Channel Automotive 40-V High-Side LED Driver with FlexWire", Apr. 2019, available from the Internet: <URL:https://www.ti.com/lit/ds/symlink/tps929120-q1. pdf?ts=1700162878816&ref_url=https%253A%252F%252Fwww. ti.com%252Fproduct%252FTPS929120-Q1>, (165 pgs).

(Continued)

*Primary Examiner* — Temesghen Ghebretinsae

(74) *Attorney, Agent, or Firm* — Knobbe, Martens, Olson & Bear, LLP

(57) ABSTRACT

Fault monitoring systems and methods presented herein perform steps comprising, in response to a host device receiving a valid command, if no fault condition is present in a circuit, communicating an acknowledgement response to the host device. Whether a fault condition is present in the circuit may be determined by a monitoring circuit. If a fault condition is found, an error acknowledgement response that is different from the acknowledgement response may be communicated to the host. Contrariwise, if an invalid command is received from the host, no acknowledgement response and no error acknowledgement response are communicated to reduce unnecessary communication.

17 Claims, 5 Drawing Sheets

(58) Field of Classification Search
CPC . G06F 13/387; G06F 13/4004; G06F 13/4295
See application file for complete search history.

(56)                References Cited

OTHER PUBLICATIONS

Infineon technologies AG, "LITIX Pixel Rear Multi-channel LED driver", TLD7002-16ES Datasheet, 2022, available from the Internet:.<URL:https://www.infineon.com/dgdl/Infineon-TLD7002-16ES-DataSheet-v01_00-EN.pdf?fileId=8ac78c8c81ae03fc0181f6f7d21c2b5b>, (82 pgs).
Extended European Search Report mailed May 6, 2024 in related European patent application No. 23218130.5, (13 pgs).
Response to Extended European Search Report filed Oct. 15, 2024 in related European patent application No. 23218130.5, (4 pgs).
Data Device Corporation, "MIL-STD-1553 Designer's Guide—Data Device Corporation", Sixth Edition, www.ddc-web.com/1553DesignersGuide, Dec. 8, 2003; pp. 1-I-58, (68 pgs).
Data Device Corporation, "MIL-STD-1553 Designer's Guide—Data Device Corporation", Sixth Edition, www.ddc-web.com/1553DesignersGuide, Dec. 8, 2003; pp. I-59-II-12, (46 pgs).
Data Device Corporation, "MIL-STD-1553 Designer's Guide—Data Device Corporation", Sixth Edition, www.ddc-web.com/1553DesignersGuide, Dec. 8, 2003; pages II-13-V-17, (79 pgs).
Data Device Corporation, "MIL-STD-1553 Designer's Guide—Data Device Corporation", Sixth Edition, www.ddc-web.com/1553DesignersGuide, Dec. 8, 2003; pages V-18-VII-7 (84 pgs).
Data Device Corporation, "MIL-STD-1553 Designer's Guide—Data Device Corporation", Sixth Edition, www.ddc-web.com/1553DesignersGuide, Dec. 8, 2003; pp. VIII-1 (63 pgs).
Data Device Corporation, "MIL-STD-1553 Designer's Guide—Data Device Corporation", Sixth Edition, www.ddc-web.com/1553DesignersGuide, Dec. 8, 2003; pp. IX-56-XI-4 (27 pgs).

* cited by examiner

Figures 2A, 2B:
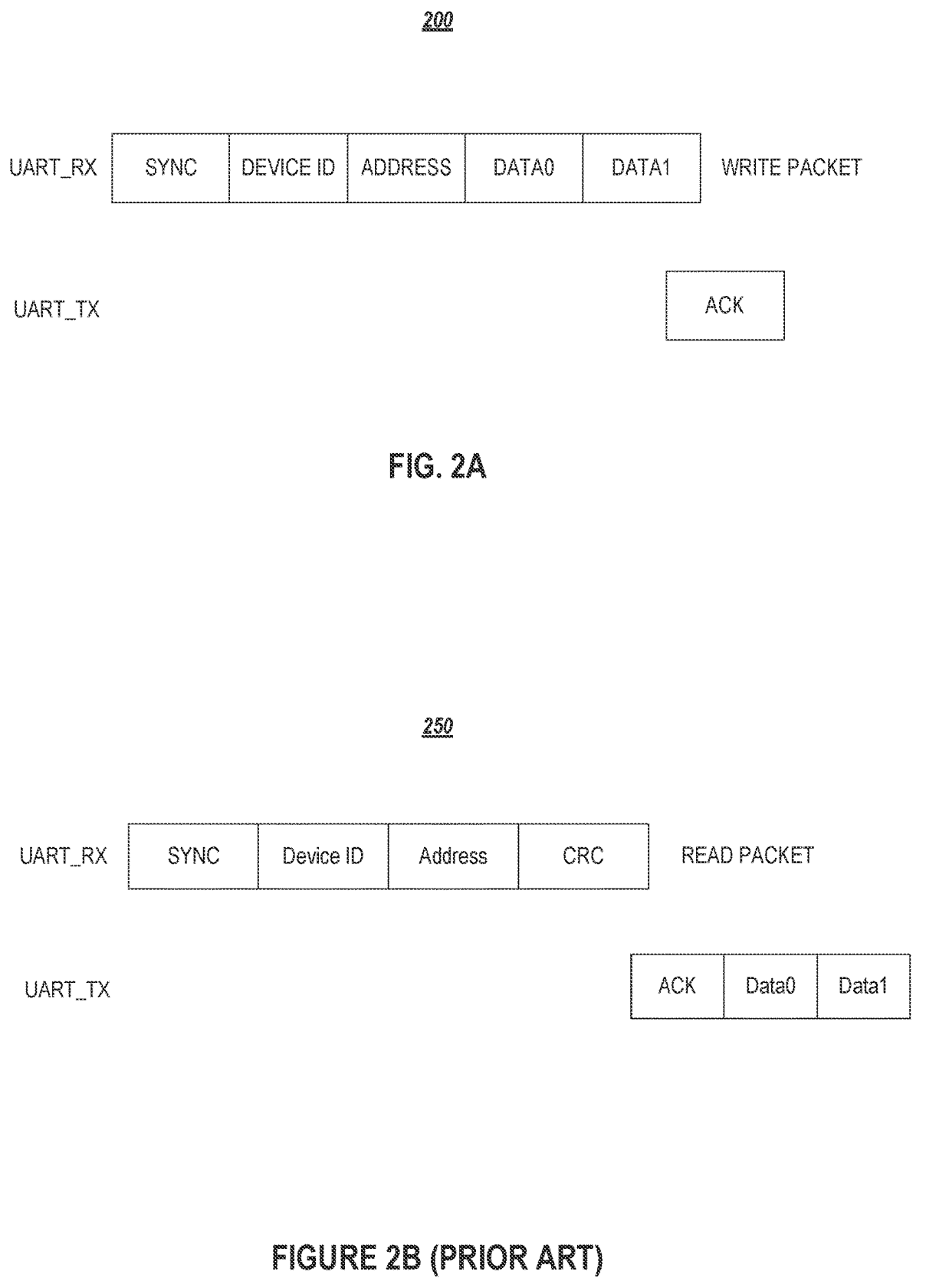

_200_

| UART_RX | SYNC | DEVICE ID | ADDRESS | DATA0 | DATA1 | WRITE PACKET |
|---------|------|-----------|---------|-------|-------|--------------|

| UART_TX | ACK |
|---------|-----|

| UART_RX | SYNC | Device ID | Address | CRC | READ PACKET |
|---------|------|-----------|---------|-----|-------------|

| UART_TX | ACK | Data0 | Data1 |
|---------|-----|-------|-------|

| Start | D0 | D1 | D2 | D3 | D4 | D5 | D6 | D7 | Parity | Stop |

FAULT MONITORING SYSTEMS AND METHODS

CROSS REFERENCE TO RELATED PATENT APPLICATIONS

The present application claims priority benefit, under 35 U.S.C. § 119(e), to commonly-assigned U.S. Provisional Patent Application No. 63/435,206, filed on Dec. 23, 2022, entitled "Fault Monitoring Systems And Methods," and listing as inventor Mark Patrick Derhake, which application is herein incorporated by reference as to its entire content. Each reference mentioned in this patent document is incorporated by reference herein in its entirety.

BACKGROUND

A. Technical Field

The present disclosure relates generally to systems and methods for fault monitoring applications such as automotive lighting applications. More particularly, the present disclosure relates to systems and methods for improving bandwidth in serial communication applications.

B. Background

To reduce circuit complexity and cost, adaption of Universal Asynchronous Receiver-Transmitter (UART) over Controller Area Network (CAN) communication in applications such as automotive lighting applications has become commonplace. Conventionally, a host microcontroller unit (MCU), which is implemented on the same board as a number of slave devices, directly communicates with the slave devices that, in turn, control a number of LEDs. The slave devices typically have fault monitoring circuitry that, in the event that a fault is detected, alert the host MCU, e.g., to initiate some action. In such conventional approaches, communication between the MCU and the slave devices involves the MCU individually communicating commands to each slave device to constantly poll the fault registers of the slave devices. A fault register typically contains all the possible fault conditions that the fault monitoring circuit may have detected. However, such an approach increases the number of commands that the MCU must send, thereby, degrading the usable bandwidth available for communication. Accordingly, what is needed are systems and methods that alleviate the shortcomings of existing designs.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

FIG. 2A shows a common format for a write packet and a corresponding acknowledgement packet.

FIG. 2B shows a common format for a read packet and a corresponding acknowledgement packet.

FIG. 4 illustrates an example of an error acknowledgment frame according to various embodiments of the present disclosure.

DETAILED DESCRIPTION OF EMBODIMENTS

Figure 1:
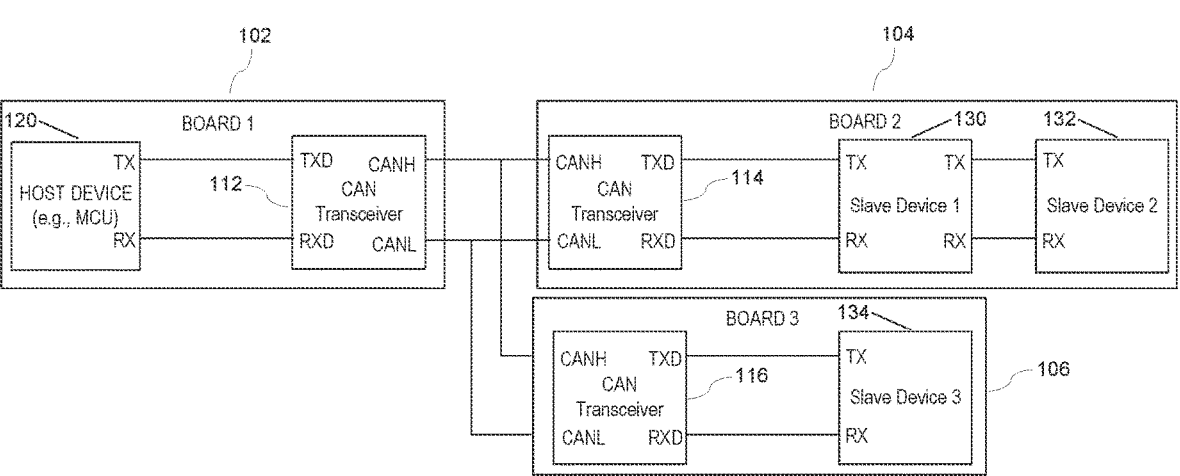
FIG. 1 illustrates an exemplary UART over CAN communication system according to various embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists that follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, it shall be noted that embodiments described herein are framed in the context of UART over CAN communication systems, but one skilled in the art shall recognize that the teachings of the present disclosure are not limited to such applications and may equally be used in other contexts.

In this document the terms "acknowledgment," "acknowledgment frame," and "acknowledgment response" May be used interchangeably. Similarly, the terms "acknowledgement frame," "error acknowledgement frame," and "error acknowledgment response" May be used interchangeably. Further, the terms "microcontroller unit" and "microcontroller" are used interchangeably. The terms "normal" and "traditional" refer to conventional methods recognized by one of skilled in the art.

FIG. 1 illustrates an exemplary UART over CAN communication system according to various embodiments of the present disclosure. System 100 comprises three distinct boards 102-106, each comprising a CAN transceiver 112-116. In embodiments, board 102 may comprise a host device, which in FIG. 1 is implemented as a host MCU. Conversely, board 104 comprises slave devices 130, 132, and board 106 comprises slave device 134. Slave devices 130-134 may perform any number of tasks depending on the received commands from host MCU 120.

As mentioned in the background, in traditional applications slave devices that are equipped with fault monitoring circuitry are implemented on the same board as the host MCU. Typical faults or errors that the fault monitoring circuitry may detect in lighting applications and communicate to the host MCU, include LEDs being electrically shorted across a terminal or to ground; an open circuit condition in the circuit, such as in a PCB trace of an LED; a temperature limit being exceeded; an incorrect address error; a communication error; and many others.

Figure 3:
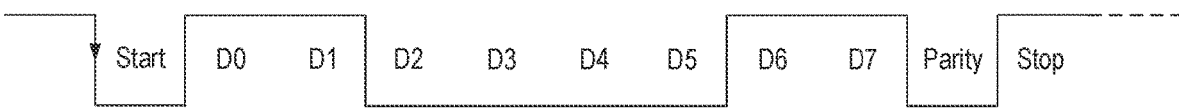
FIG. 3 shows an example of a conventional acknowledgement frame.

The traditional approach, where the MCU individually communicates with each slave device, sends commands to constantly poll the fault registers of the slave devices, and receives from each slave device fault information, unnecessarily increases the bandwidth overhead and degrades the usable bandwidth available. For example, whenever a host MCU sends a valid command to any of the slave devices, e.g., in a write packet, as illustrated in FIG. 2A, or in a read packet, as illustrated in FIG. 2B, the slave device will typically respond with a corresponding frame of data acknowledging that the slave device successfully received the command sent by the host MCU. FIG. 3 shows an example of a conventional acknowledgement frame that contains eight data bits between a start bit, a parity bit (0xC3), and a stop bit. To reduce the volume of communication between the MCU and the individual slave devices and increase available bandwidth, it would thus be desirable to have systems and methods that allow for reducing the total number of commands that the MCU must communicate to various devices during regular operation.

Returning to FIG. 1, various embodiments herein utilize host MCU 120 that may remotely control any number of slave devices (e.g., 130-134) without the need for local on-board MCUs or clocks. Advantageously, this allows a single MCU (e.g., 120) to control any number of boards, for example, to control various headlights rather than having to implement a dedicated MCU for each board, i.e., each headlight. Further, to help alleviate the need for actively polling slave devices 130-134 for faults by specifically communicating to fault registers (not shown in FIG. 1), various embodiments herein utilize a novel type of acknowledgment frame that may serve as an error acknowledgment frame. In embodiments, such error acknowledgment frames may comprise any number of bits, e.g., located between at least one start bit and one stop bit. An error acknowledgement frame may be unique and distinctly different from a traditional acknowledgement frame in that, in operation, in response to a successful command being sent from host MCU 120 to any of slave devices 130-134 and any number of faults being present in the circuit, instead of sending a traditional acknowledgement frame, a different frame may be sent.

It is noted that in addition to comprising, for example, generic error messages, an error acknowledgment response according to various embodiments herein may further comprise any number of unique responses representing any number or combination of faults that may have been detected by any of slave devices 130-134.

FIG. 4 illustrates an example of an error acknowledgment frame (0x3C) according to various embodiments of the present disclosure. As depicted, error acknowledgment frame 400 is uniquely different from traditional acknowledgement frames, such as that shown in FIG. 3. It is understood that, in embodiments, if no error is present, error acknowledgement frame 400 may mirror a traditional acknowledgement frame. In addition, in embodiments, if an error in UART communication is detected, neither a traditional acknowledgement frame nor an error acknowledgement frame is sent.

Advantageously, error acknowledgment frame 400 may be used to constantly monitor slave devices for faults in circuit behavior without the MCU having to send additional commands to poll the slave devices' fault registers.

In embodiments, an individual slave device, in response to receiving a valid command, e.g., from an MCU, may respond with either a traditional acknowledgment or a novel error acknowledgement. Conversely, in cases where a slave device received an invalid command, the slave device may respond by returning no acknowledgement.

Advantageously, a combination of these responses allows for the host MCU to achieve near real-time monitoring of any number of slave devices. For comparison, using conventional methods, assuming there exist 11 slave devices that are receiving commands, to periodically poll each device for its error status, four frames (sync, device ID, address, and CRC) must be sent to each device to request their status. In return, each device will respond with a normal acknowledgement frame, and two additional frames that contain data of the error register. As a result, there are 847 bits being sent and received in total ((11 bits per frame)*(4 command frames+3 response frames)*(11 devices)). Further, assuming communication at 1 MBPS (one million bits per second), this means that 847 microseconds of additional time is used in looking at the error status registers. Further, this problem is exacerbated at lower communication rates. In contrast, the systems and methods herein reduce or completely eliminate this additional time, as this information would have been communicated during prior write commands.

Figure 5:
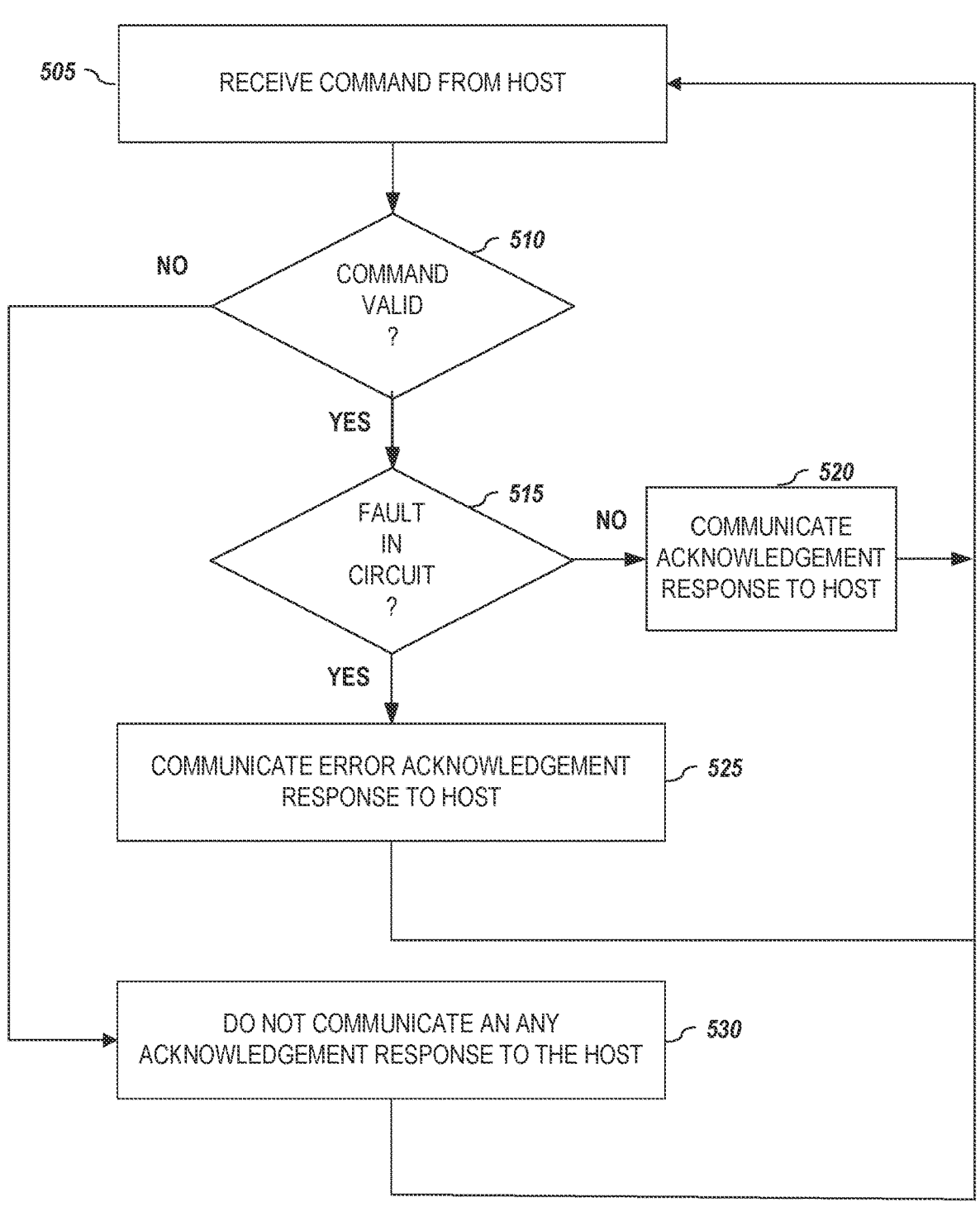
FIG. 5 is a flowchart of an illustrative fault communication process for increasing throughput, in accordance with various embodiments of the present disclosure.

FIG. 5 is a flowchart of an illustrative fault communication process for increasing throughput, in accordance with various embodiments of the present disclosure. In embodiments, process 500 may begin at step 505 when a device, such as a board, receives a command from a host device. At step 510, it may be determined whether the received command is a valid command and, if so, process 500 may continue with step 515 to determine whether the board compromises a fault, such as, e.g., a short condition. Otherwise, once it is determined that the received command is invalid, process 500 may move to step 530 to cause the board to not respond to the host with an acknowledgement and resume, at step 505, with receiving a next comment from the host. In embodiments, if, at step 515, it is determined that the board comprises no fault, the board may communicate an acknowledgement to the host and resume with step 505 to receive the next comment from the host.

Conversely, if it is determined that the board does comprise a fault, the board may communicate, at step 525, an error acknowledgement to the host before resuming to receive the next comment from the host, at step 505. One skilled in the art shall recognize that: (1) certain steps may optionally be performed; (2) steps may not be limited to the specific order set forth herein; (3) certain steps may be performed in different orders; and (4) certain steps may be done concurrently.

Overall, the systems and methods herein implement a novel error acknowledgement frame that alerts a host device of faults to improve communication throughput and allow for near real-time monitoring of faults without the need to directly request fault information from each slave device.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A fault communication method for increasing throughput, the fault communication method comprising:

in response to receiving a valid command from a first device, performing steps comprising:

in response to no fault condition being present in a circuit, communicating an acknowledgement response to the first device; and in response to determining that a fault condition is present, communicating an error acknowledgement response to the first device, the error acknowledgement response being different from the acknowledgement response; and in response to receiving from the first device an invalid command representing a communication error between the first device and at least one of one or more devices, communicating neither the acknowledgement response nor the error acknowledgement response to the first device, wherein the invalid command represents the communication error in a Universal Asynchronous Receiver-Transmitter (UART) communication between the first device and at least one of the one or more devices.

2. The fault communication method according to claim 1, wherein the first device is a host device that controls the one or more devices.

3. The fault communication method according to claim 2, further comprising, in response to determining that the fault condition is present in the circuit, storing a fault in a register of a second device among the one or more devices.

4. The fault communication method according to claim 1, further comprising, using a monitoring circuit to determine whether the fault condition is present in the circuit.

5. The fault communication method according to claim 4, wherein the first device does not send a command to poll the monitoring circuit to determine whether the fault condition is present.

6. The fault communication method according to claim 1, wherein the valid command comprises a command to control one or more lighting functions in an automotive lighting application.

7. The fault communication method according to claim 1, wherein the error acknowledgement response is communicated within an acknowledgement frame that comprises a number of bits located between at least one start bit and one stop bit.

8. A fault detection circuit comprising:

a monitoring circuit coupled to a circuit, the monitoring circuit determines whether a fault condition is present in the circuit; and a fault register coupled to the monitoring circuit, the fault detection circuit, in response to receiving a valid command from a host device, performs steps comprising:

in response to no fault condition being present in the circuit, communicating an acknowledgement response to the host device; and in response to determining that the fault condition is present, communicating an error acknowledgement response to the host device, the error acknowledgement response being different from the acknowledgement response; and in response to receiving from the host device an invalid command representing a communication error between the host device and at least one of one or more devices, not communicating the acknowledgement response or the error acknowledgement response to the host device to reduce unnecessary communication, wherein the invalid command represents the communication error in a Universal Asynchronous Receiver-Transmitter (UART) communication.

9. The fault detection circuit according to claim 8, wherein the fault register is not periodically polled to determine whether the fault condition is present.

10. The fault detection circuit according to claim 8, wherein the error acknowledgement response comprises an acknowledgement frame that comprises a number of bits located between at least one start bit and one stop bit.

11. The fault detection circuit according to claim 8, wherein the error acknowledgement response comprises information identifying a specific fault condition detected by the monitoring circuit.

12. The fault detection circuit according to claim 8, wherein the valid command comprises a command to control one or more lighting functions in an automotive lighting application.

13. A fault detection system comprising:

a circuit;

a host device coupled to the circuit;

a fault detection circuit coupled to the host device, the fault detection circuit comprising:

a fault register; and a monitoring circuit that determines whether a fault condition is present in the circuit, wherein the fault detection circuit is configured to:

in response to receiving a valid command from the host device, in response to no fault condition being present in the circuit, communicating an acknowledgement response to the host device; and in response to determining that the fault condition is present, communicating an error acknowledgement response to the host device, the error acknowledgement response being different from the acknowledgement response; and in response to receiving from the host device an invalid command representing a communication error between the host device and at least one of one or more devices, not communicating the acknowledgement response or the error acknowledgement response to the host device, wherein the invalid command represents the communication error in a Universal Asynchronous Receiver-Transmitter (UART) communication.

14. The fault detection system according to claim 13, wherein the fault register is not periodically polled to determine whether the fault condition is present.

15. The fault detection system according to claim 13, wherein the host device controls the one or more devices.

16. The fault detection system according to claim 13, wherein the error acknowledgement response comprises information identifying a specific fault condition detected by the monitoring circuit.

17. The fault detection system according to claim 13, wherein the valid command comprises a command to control one or more lighting functions in an automotive lighting application.

* * * * *